Aug. 11, 1925.　　　　　　　　　　　　　　　1,549,597
L. B. MILLER
SILICA GLASS
Filed April 1, 1921　　　　3 Sheets-Sheet 2

Inventor
Levi B. Miller
By Albert G. Davis
His Attorney

Aug. 11, 1925.

L. B. MILLER 1,549,597

SILICA GLASS

Filed April 1, 1921

3 Sheets-Sheet 3

Inventor
Levi B. Miller
By Albert G. Davis
His Attorney

Patented Aug. 11, 1925.

1,549,597

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

SILICA GLASS.

Application filed April 1, 1921. Serial No. 457,660.

*To all whom it may concern:*

Be it known that I, LEVI B. MILLER, a citizen of the United States, residing at Lynn, in the county of Essex, State of Massachusetts, have invented certain new and useful Improvements in Silica Glass, of which the following is a specification.

My invention relates to the manufacture of transparent, substantially bubble-free silica glass, a material commonly also known as fused or amorphous quartz.

As described in a copending application, Serial No. 457,030 filed March 30, 1921, by Philip K. Devers, transparent silica glass may be made by fusing quartz, or other suitable form of pure silica, in a vacuum, and then compressing the mass while plastic to substantially eliminate the cavities which are formed in the fusion even when the silica is fused in a vacuum.

The present invention constitutes an improvement in the method of working silica glass in accordance with which vacuum-fused silica glass is moulded in the presence of gas under substantial pressure to a desired form, for example, by extruding the plastic glass from the heating zone directly into the atmosphere. I have devised an apparatus for carrying out the extrusion process which constitutes an important part of my invention. The novel features of my invention will be pointed out with particularity in the appended claims. Among the advantages secured by my invention are the easy accessibility of the heating zone, the delivery of the shaped silica into the open where it may be chilled to prevent deformation, the utilization of a cheap material, such as graphite, as a container for fusions of silica, and the provision of apparatus for producing directly from plastic silica, shaped articles, such as tubes, which are transparent and substantially free from bubbles.

Figure 1:
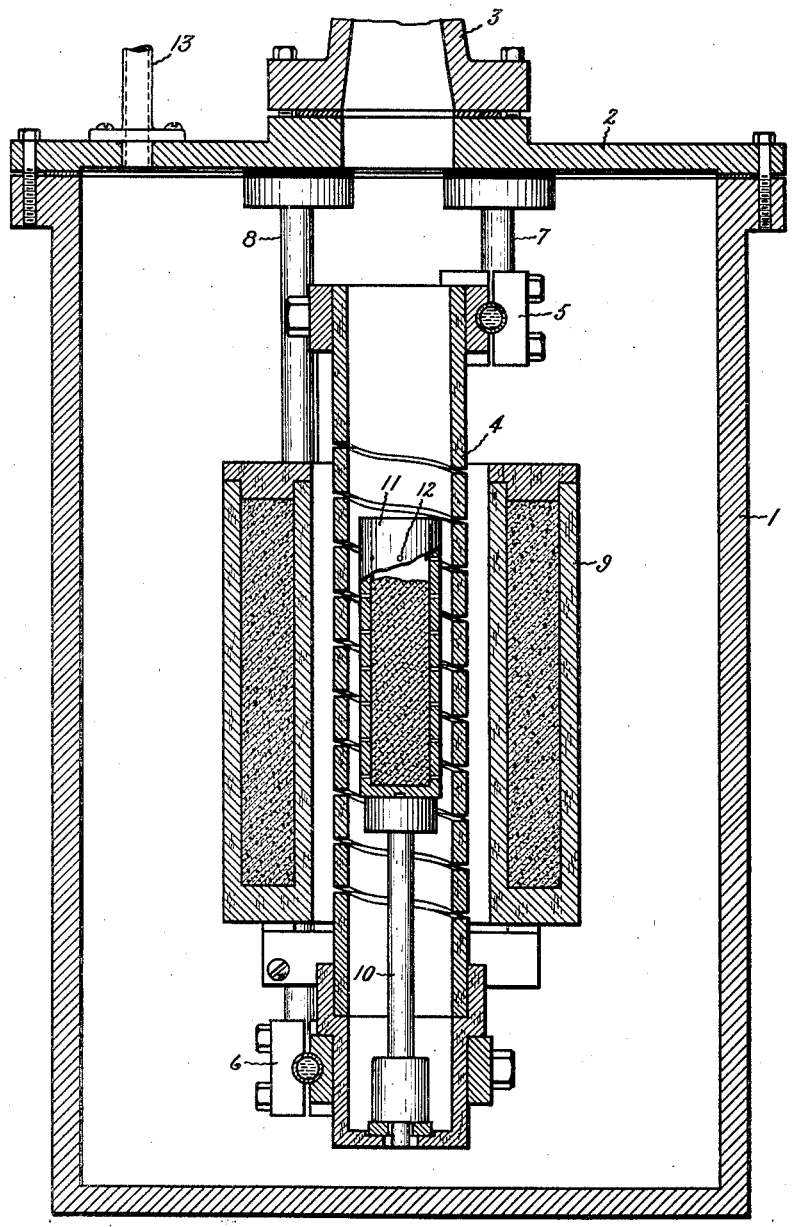
Figure 2:
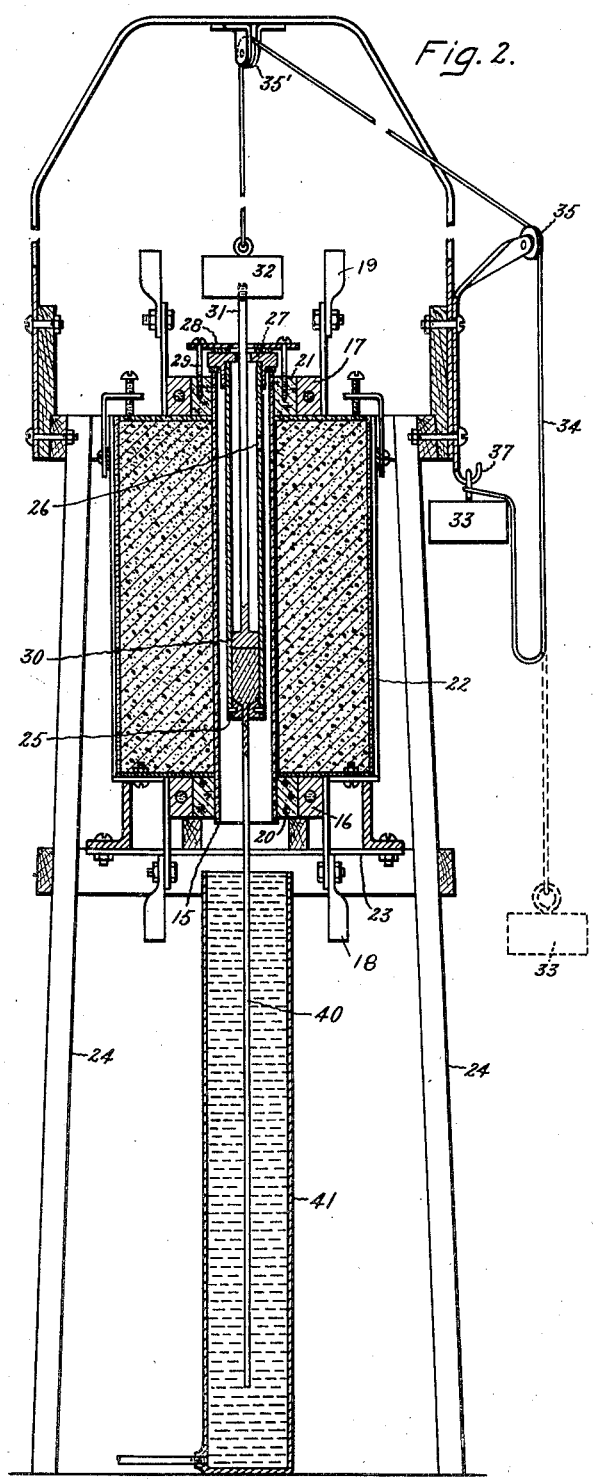
Figure 3:
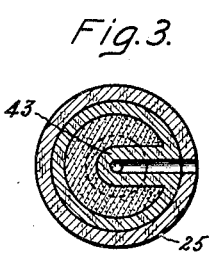
Figure 4:
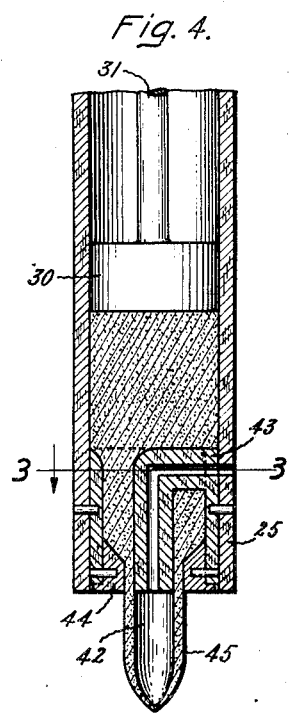
Figure 5:
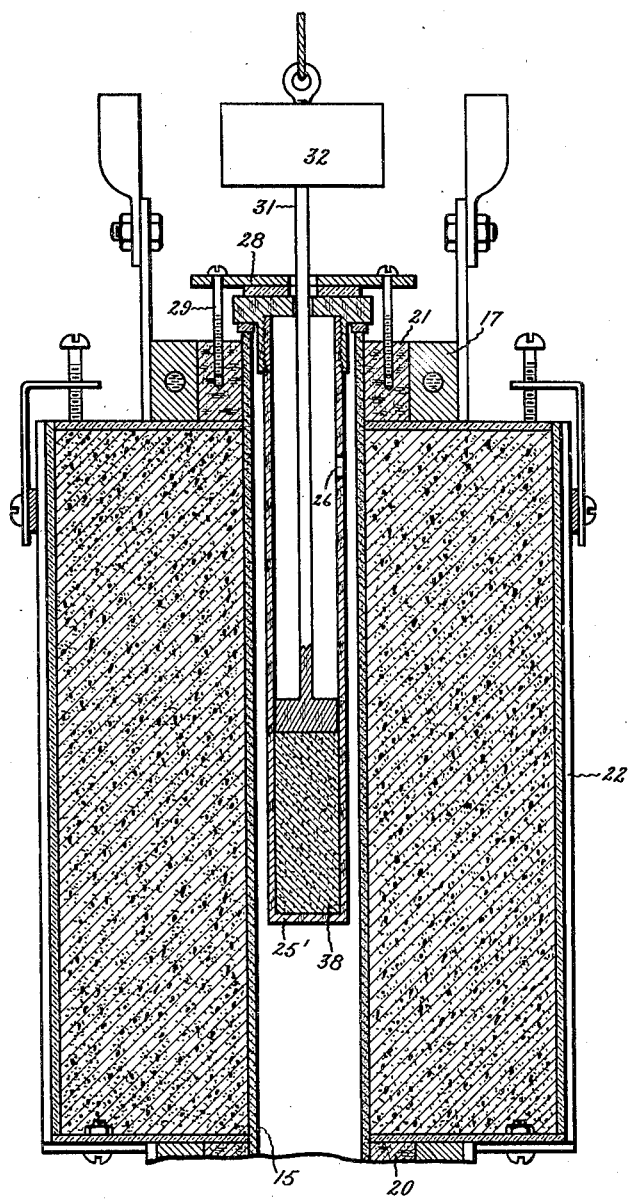

For a complete understanding of my invention, reference may be had to the following description taken in connection with the accompanying drawings in which Fig. 1 is a vertical section of a furnace suitable for fusing crystalline quartz in a vacuum; Fig. 2 is a vertical section of a furnace having a heating chamber open to the atmosphere and being provided with means for extruding vacuum-fused quartz under pressure; Figs. 3 and 4 are detail sectional views of a die suitable for extruding tubes of quartz glass; and Fig. 5 is a vertical section of a modification of my new furnace.

In the practice of the process described in the Devers application, silica is rendered substantially bubble-free by first melting in vacuo crystalline quartz, or other suitable form of silica, and then compressing the silica while plastic in a vacuum. I have discovered that during the subsequent step of the process that is, the compression and extrusion, a vacuum is not essential. In fact, a gaseous pressure during this stage of the process is accompanied by certain advantages. For example, it coacts with pressure mechanically applied to the plastic silica and also reduces volatilization of the silica during heating. Moreover, when the compression and molding process is carried out at atmospheric pressure the convenience of carrying out the process is greatly enhanced.

In carrying out my invention, as a preliminary step, a suitable form of silica, for example, crystalline quartz, is fused in a good vacuum. A furnace suitable for carrying out the fusion is shown in section in Fig. 1. The furnace here shown comprises a container 1, having a removable cover 2, provided with a removable column 3, shown in part broken away. The parts of this furnace have been indicated only in a very diagrammatic manner as vacuum furnaces are well known. A furnace of the type here shown is described in Arsem Patent No. 785,535. A helical carbon or graphite heater 4 is connected by suitable terminal clamps 5, 6, to conductors 7, 8. The conductors are connected to external terminals (not shown) and are suitably supported from the furnace cover 2 and electrically insulated from each other as indicated. A screen 9 of carbon or other suitable refractory material surrounds the heater 4. Within the heater 4 supported on a pedestal 10 is a crucible 11 consisting of graphite within which the charge of silica is brought to fusion. Preferably this crucible 11 is provided with a number of vent holes 12, as indicated, to enable gases to escape from the mass within the crucible. The crucible 11 should be fired at about 2000° C. in a vacuum before silica is melted therein to volatilize mineral matter in the graphite.

When a charge of crystalline quartz is heated in the crucible 11, the furnace is exhausted of air and other gas through a tube 13 with a pump kept in constant operation. The pressure preferably should be reduced to a few millimeters of mercury, or even lower.

At about 550° C. the crystalline quartz is shattered into many pieces and as already indicated, the coalescence of these pieces in vacuo avoids undue trapping of air or other gas. The silica is heated to a temperature of about 1650 to 1750° C. in vacuo until a homogeneous glassy mass is produced without open surface cavities. Of course, a large number of charges may be fused simultaneously, only one being shown for purpose of illustration. The charge of fused silica is not heated highly enough nor long enough to cause prohibitive losses by vaporization. Ordinarily the silica charge is brought up to a temperature of 1750° C. and the current is then cut off immediately and the furnace allowed to cool. The resulting slug of amorphous or glassy silica is transferred to a furnace such as shown in Fig. 2.

This furnace provides a heating space which is open to the atmosphere so that the silica glass in its plastic state is not only acted upon by atmospheric pressure, but can be extruded directly into the open, thereby aiding the operator when carrying out the process. The furnace comprises a heater 15, which for example, may consist of a carbon tube connected at opposite ends to water cooled terminals 16, 17, to which are connected electric conductors 18, 19. Carbon or graphite rings 20, 21, preferably are placed between the tube 15 and the terminals 16, 17, which may consist of copper. The carbon tube is surrounded by a packing of charcoal or other suitable heat insulating material contained within a receptacle 22, which conveniently consists of asbestos.

The furnace is supported at a considerable height upon a platform 23, the upper end of the furnace as well as the platform 23 being connected to uprights 24. Within the heater 15 is a graphite crucible 25 which projects through the upper part of the furnace. The interior of the crucible 25 communicates with the heating space through a vent hole 26. The space between the graphite crucible 25 and the heater tube 15 is closed by a cap 27 consisting of graphite or other suitable material suitably connected to the ring 21 by a plate 28 with screws 29, asbestos insulating rings being provided both between the cap 27 and the tube 15 and between the cap 27 and the plate 28. Fitting into the graphite crucible 15 is a graphite piston 30 connected to a rod 31, at the upper end of which is carried a weight 32. This weight may be counterbalanced by another weight 33 (when in the position shown by dotted lines). The two weights are attached to a flexible cable 34 passing over the pulleys 35, 35'. The bottom of the graphite crucible may be closed, as shown in Fig. 5 at 25' when it is desired only to produce a slug or mass of clear silica glass, or as shown in Fig. 2, the bottom of the crucible is provided with an extrusion opening or a die, as will be hereinafter more fully explained.

Before the furnace is put into operation and before a charge of silica is placed therein the parts of the furnace subject to heating, which consist entirely of carbon, are purified by making a blank run at or slightly above the operating temperature. Preferably the graphite crucible, the piston and the die if used as later described, are fired in a vacuum to about 2000° C. or over, before assembling the furnace. By thus volatilizing mineral matter from the crucible and other furnace members which come into direct contact with the fused silica or are located closely adjacent the silica charge, it is possible to obtain a clear, uncontaminated fusion even at the high temperatures employed. Former attempts to fuse silica in carbon containers resulted in a cloudy or even opaque product. I have found that this contamination of the silica was not due to chemical combination of the silica and the carbon but was due to mineral impurities in the carbon which dissolved in the silica. Some chemical reaction between the silica and the carbon appears to occur at high temperature and carbon monoxide gas is produced which soon fills up the furnace interior and prevents access of air.

In any event, pure clear silica glass may be produced in apparatus prepared in accordance with my invention.

When the furnace parts have been purified a mass of vacuum-fused silica glass prepared as above described is placed in the crucible 25 and the furnace is brought up to the operating temperature of about 1750° C. As the space within the heater tube 15 is closed at the top, air is soon excluded by the heated carbon-monoxide gas generated within the furnace. Pressure is exerted upon the mass of silica when plastic, for example, by lifting the counterbalancing weight 33 and placing it upon hook 37 (as shown in full lines), thereby causing the full force of the weight 32 which may weigh 30 to 35 pounds, or more, to be exerted through the graphite piston through the mass of silica glass the cross-section of which may consist of about 1 to 3 sq. in. As already indicated, when the temperature of the silica glass reaches about 1700 to 1750° C. the pressure exerted thereupon very largely, or even entirely, eliminates bubbles and produces a clear glassy mass. In this manner I may produce by the apparatus shown in Fig. 5 a slug 38 of clear silica glass.

I prefer, in accordance with my invention, to utilize the pressure upon the fused silica glass, not only to eliminate bubbles, but to shape the glass into suitable form such as cane or tubes. As shown in Fig. 2, the bottom of the crucible 25 is provided with a perforation through which may be extruded a rod or cane of silica glass 40, as shown in the drawing. In order to prevent deformation of the cane, it is preferably extruded directly into a cooling liquid, for example, water, contained in the receptacle 41. The water not only cools the cane but also counterbalances the weight of the cane in part thereby preventing the weight of the cane extruded from the crucible from acting cumulatively upon the still plastic silica as it issues from the crucible, or in other words, to prevent the weight of the suspended mass from decreasing the diameter of the extruded cane.

I have shown in Figs. 3 and 4 a suitable die for making quartz tubing. In this case the bottom of the crucible is provided with an annular opening. The core 42, consisting of graphite, is connected to the side of the crucible 25 by a right-angled offset section 43 removed a sufficient distance from the end of the tube to permit the plastic quartz to flow past the section 43 and then to reunite upon entering the throat of the circular extrusion opening between the core 42 and the reinforced end wall 44 of the crucible. Preferably the core 42 is made tubular and a hollow core communicates with the atmosphere to permit of the discharge of gases generated in the interior of the extruded tube 45, thereby maintaining the tube at substantially uniform diameter.

What I claim as new and desire to secure by Letters Patent of the United States, is:—

1. The method of making shaped articles of transparent silica which consists in heating silica to a plastic state in a vacuum, the temperature being high enough to cause sealing over of cavities but below the temperature of active volatilization, removing the silica to a heating zone open to the atmosphere, and shaping the same under pressure while in a plastic state.

2. The method of making shaped articles of transparent silica glass which consists in fusing silica in a vacuum, cooling the same to a congealing temperature, transferring said vacuum-fused silica to a heating space under atmospheric pressure, reheating the silica to a plastic state and molding to a desired form by applying pressure.

3. The method of making tubes of transparent silica glass which consists in converting clear, crystalline silica in a vacuum to glassy silica, transferring the same to a heating space in communication with the atmosphere, heating said glassy silica to a plastic state and extruding the same through a die into the atmosphere.

4. The method of making shaped articles of amorphous silica which consists in fusing silica in a vacuum and thereupon extruding the fused mass under gaseous pressure.

5. The method of making shaped articles of bubble-free glassy or amorphous silica which consists in heating vacuum-fused silica to a plastic state in a carbon container in contact with an inert gas, compressing said silica while plastic to reduce enclosed cavities and thereupon shaping said plastic silica into desired form.

6. The method of making silica glass which consists in heating crystalline quartz in a vacuum to a temperature sufficiently high to cause the fragments produced by the shattering of the crystalline quartz at an elevated temperature to reunite at a higher temperature to form a plastic glass, continuing the heating until exposed cavities in the glass have sealed, continuing the heating in the presence of a gas under substantial pressure, and shaping the silica glass under pressure in said gas.

7. The process of shaping hollow quartz articles which consists in fusing quartz under substantially atmospheric pressure and extruding the fused quartz into the atmosphere through a die adapted to produce the hollow body and during extrusion discharging gases generated within the hollow body.

8. The process of treating quartz which consists in heating said quartz in a carbonaceous crucible free from mineral impurities in contact with the atmosphere to a temperature of plasticity but below the temperature of active vaporization and by extrusion into the atmosphere shaping said plastic mass to desired form.

9. The process of making quartz glass which consists in heating vacuum-fused quartz in a carbonaceous container in a heating space open to the atmosphere to a temperature sufficiently high only to render said quartz plastic and then shaping said plastic quartz by the application of pressure.

10. The process of shaping silica glass which consists in heating substantially said material to a temperature of about 1750° C. in a graphite container open to the atmosphere and then extruding said glass under pressure.

11. The process of shaping quartz or silica which consists in heating quartz to a temperature of plasticity but materially below the temperature of active volatilization and extruding the plastic mass under pressure through a die of carbonaceous material into a zone maintained at a temperature sufficiently low to harden said quartz.

12. The process of shaping silica which consists in heating silica in a carbonaceous container free from mineral impurities to a temperature of about 1750° C., extruding the plastic mass by pressure through an orifice of desired configuration and conducting the extruded quartz into a cooling medium.

13. The process of making clear quartz or silica tubing which consists in heating substantially gas-free quartz glass in a mineral-free carbonaceous container to a temperature of plasticity, extruding the plastic mass through an annular opening, equalizing the pressure inside said tubing with atmospheric pressure and conducting the extruded tube into a zone maintained at a temperature sufficiently low to congeal said quartz.

14. The process of treating quartz or silica which consists in heating said material to a temperature sufficiently only to produce plasticity, extruding the same into a zone maintained at a hardening temperature and supporting the extruded material to maintain a substantially constant rate of extrusion.

15. The process of producing substantially clear quartz or silica glass which consists in heating pure silica in a vacuum to a temperature of about 1650° C. to 1750° C., transferring the same to a heating space which is in communication with the atmosphere, heating to a temperature of plasticity and extruding the plastic mass by pressure into a zone maintained at a temperature at which quartz congeals.

16. The method of working quartz which consists in heating the same to a temperature of plasticity, and extruding the plastic mass under pressure into a body of liquid.

In witness whereof I have hereunto set my hand this 30th day of March, 1921.

LEVI B. MILLER.